United States Patent
Tseng et al.

(10) Patent No.: US 10,637,518 B2
(45) Date of Patent: Apr. 28, 2020

(54) WIRELESS COMMUNICATION DEVICE WITH FREQUENCY PLANNING FOR SPUR AVOIDANCE UNDER COEXISTENCE OF MULTIPLE WIRELESS COMMUNICATION SYSTEMS

(71) Applicant: MEDIATEK INC., Hsin-Chu (TW)

(72) Inventors: Sheng-Che Tseng, Hsinchu (TW);
Yu-Lin Hsieh, Hsinchu (TW);
Ming-Yu Hsieh, Hsinchu (TW);
Shih-Chieh Yen, Hsinchu (TW);
Jen-Kuei Tsai, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/237,740

(22) Filed: Jan. 1, 2019

(65) Prior Publication Data

US 2019/0238167 A1 Aug. 1, 2019

Related U.S. Application Data

(60) Provisional application No. 62/623,578, filed on Jan. 30, 2018.

(51) Int. Cl.
*H04B 1/04* (2006.01)
*H04B 1/30* (2006.01)
*H04W 88/06* (2009.01)
*H04B 1/525* (2015.01)

(52) U.S. Cl.
CPC ............ *H04B 1/0475* (2013.01); *H04B 1/30* (2013.01); *H04B 1/525* (2013.01); *H04W 88/06* (2013.01);
(Continued)

(58) Field of Classification Search
CPC .......... H04B 17/14; H04B 17/19; H04B 1/30; H04B 17/104; H04B 1/406; H04B 1/28;
(Continued)

(56) References Cited

U.S. PATENT DOCUMENTS 7,002,511 B1 2/2006 Ammar
7,146,136 B2 12/2006 Consolazio
(Continued)

FOREIGN PATENT DOCUMENTS

CN 107251444 A 10/2017

OTHER PUBLICATIONS

Huo, "5G Cellular User Equipment: From Theory to Practical Hardware Design", 2017.

*Primary Examiner* — Ajibola A Akinyemi
(74) *Attorney, Agent, or Firm* — Winston Hsu

(57) ABSTRACT

A wireless communication device includes a first wireless communication system and a second wireless communication system. Regarding the first wireless communication system, an up-conversion circuit up-converts a first transmit (TX) signal in a baseband to generate a second TX signal with a first carrier frequency, and a front-end circuit transmits the second TX signal to another wireless communication device. Regarding the second wireless communication system, a first down-conversion circuit down-converts a first receive (RX) signal with a second carrier frequency to generate a second RX signal with a third carrier frequency, and a second down-conversion circuit down-converts the second RX signal with the third carrier frequency to generate a third RX signal in the baseband. The third carrier frequency is different from all fundamental frequencies included in a band combination that is employed at the first wireless communication system and is supported by another wireless communication device.

20 Claims, 3 Drawing Sheets

(52) U.S. Cl.
CPC ............... *H04B 2001/0491* (2013.01); *H04B 2001/307* (2013.01)

(58) Field of Classification Search
CPC .... H04B 17/20; H04B 1/0075; H04B 1/1036; H04B 1/40; H04B 2001/1054; H04B 1/707; H04B 17/101; H04B 1/713; H04B 7/0619; H04B 7/08; H04B 1/0032; H04B 1/123
USPC ........................................................ 455/118
See application file for complete search history.

(56) References Cited

U.S. PATENT DOCUMENTS

| | | | |
|---|---|---|---|
| 7,852,281 B2 | 12/2010 | Choudhury | |
| 7,904,117 B2 | 3/2011 | Doan | |
| 8,457,026 B1 | 6/2013 | Ho | |
| 8,630,211 B2 | 1/2014 | Gainey | |
| 8,675,781 B2 | 3/2014 | Adnani | |
| 8,867,591 B2 | 10/2014 | Rofougaran | |
| 8,963,656 B2 | 2/2015 | Ali | |
| 9,525,439 B2 | 12/2016 | Yehezkely | |
| 9,774,996 B1 | 9/2017 | Frydman | |
| 2012/0040628 A1* | 2/2012 | Krug | H04B 15/04 455/86 |
| 2012/0250614 A1* | 10/2012 | Anekoji | H04B 1/001 370/328 |
| 2016/0248451 A1 | 8/2016 | Weissman | |
| 2017/0302301 A1 | 10/2017 | Tanaka | |
| 2017/0359106 A1 | 12/2017 | Wilson | |
| 2018/0352520 A1* | 12/2018 | Zhang | H04W 52/40 |
| 2019/0200245 A1* | 6/2019 | Khan | H04W 24/02 |

\* cited by examiner

WIRELESS COMMUNICATION DEVICE WITH FREQUENCY PLANNING FOR SPUR AVOIDANCE UNDER COEXISTENCE OF MULTIPLE WIRELESS COMMUNICATION SYSTEMS

CROSS REFERENCE TO RELATED APPLICATIONS

This application claims the benefit of U.S. provisional application No. 62/623,578, filed on Jan. 30, 2018 and incorporated herein by reference.

BACKGROUND

The present invention relates to wireless communication, and more particularly, to a wireless communication device with frequency planning for spur avoidance under coexistence of multiple wireless communication systems.

Wireless communication systems are widely deployed to provide various types of communication content such as voice, data, and so on. These systems may be capable of supporting communication with multiple users by sharing the available system resources (e.g., bandwidth and transmit power). For example, a mobile device (e.g., a mobile phone) may support various wireless communication systems to provide a variety of communication functions, where two or more of the wireless communication systems may operate simultaneously. However, coexistence of multiple wireless communication systems in the same device may result in an interference issue. Specifically, a transmit (TX) operation of one wireless communication system may in some cases interfere with a receive (RX) operation of another wireless communication system through an interference mechanism such as an electromagnetic (EM) path. For example, RX desensitization is caused by fundamental or harmonic spurs. Though an internal filter with high rejection capability may be used to decrease the spur level, the RX desensitization is still significant.

Thus, there is a need for an innovative design that is capable of achieving spur avoidance under coexistence of multiple wireless communication systems in a wireless communication device.

SUMMARY

One of the objectives of the claimed invention is to provide a wireless communication device with frequency planning for spur avoidance under coexistence of multiple wireless communication systems. For example, spur frequency ranges can be derived from coexistence of multiple wireless communication systems, and a specific intermediate frequency (IF) range is selected for minimizing the RX desensitization.

According to a first aspect of the present invention, an exemplary wireless communication device with coexistence of multiple wireless communication systems is disclosed. The exemplary wireless communication device includes a first wireless communication system and a second wireless communication system. The first wireless communication system includes an up-conversion circuit and a front-end circuit. The up-conversion circuit is arranged to up-convert a first transmit (TX) signal in a baseband to generate a second TX signal with a first carrier frequency. The front-end circuit is arranged to transmit the second TX signal to another wireless communication device, wherein the first carrier frequency is within a band combination that is employed at the first wireless communication system and is supported by said another wireless communication device. The second wireless communication system includes a first down-conversion circuit and a second down-conversion circuit. The first down-conversion circuit is arranged to down-convert a first receive (RX) signal with a second carrier frequency to generate a second RX signal with a third carrier frequency. The second down-conversion circuit is arranged to down-convert the second RX signal with the third carrier frequency to generate a third RX signal in the baseband. The third carrier frequency is different from all fundamental frequencies included in said all different bands.

According to a second aspect of the present invention, an exemplary wireless communication device with coexistence of multiple wireless communication systems is disclosed. The exemplary wireless communication device includes a first wireless communication system and a second wireless communication system. The first wireless communication system includes a front-end circuit and a down-conversion circuit. The front-end circuit is arranged to receive a first receive (RX) signal with a first carrier frequency from another wireless communication device, wherein the first carrier frequency is within a band combination that is employed at the first wireless communication system and is supported by said another wireless communication device. The down-conversion circuit is arranged to down-convert the first RX signal with the first carrier frequency to generate a second RX signal in a baseband. The second wireless communication system includes a first up-conversion circuit and a second up-conversion circuit. The first up-conversion circuit is arranged to up-convert a first transmit (TX) signal in the baseband to generate a second TX signal with a second carrier frequency. The second up-conversion circuit is arranged to up-convert the second TX signal with the second carrier frequency to generate a third TX signal with a third carrier frequency. The second carrier frequency is different from all fundamental frequencies included in said all different bands.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
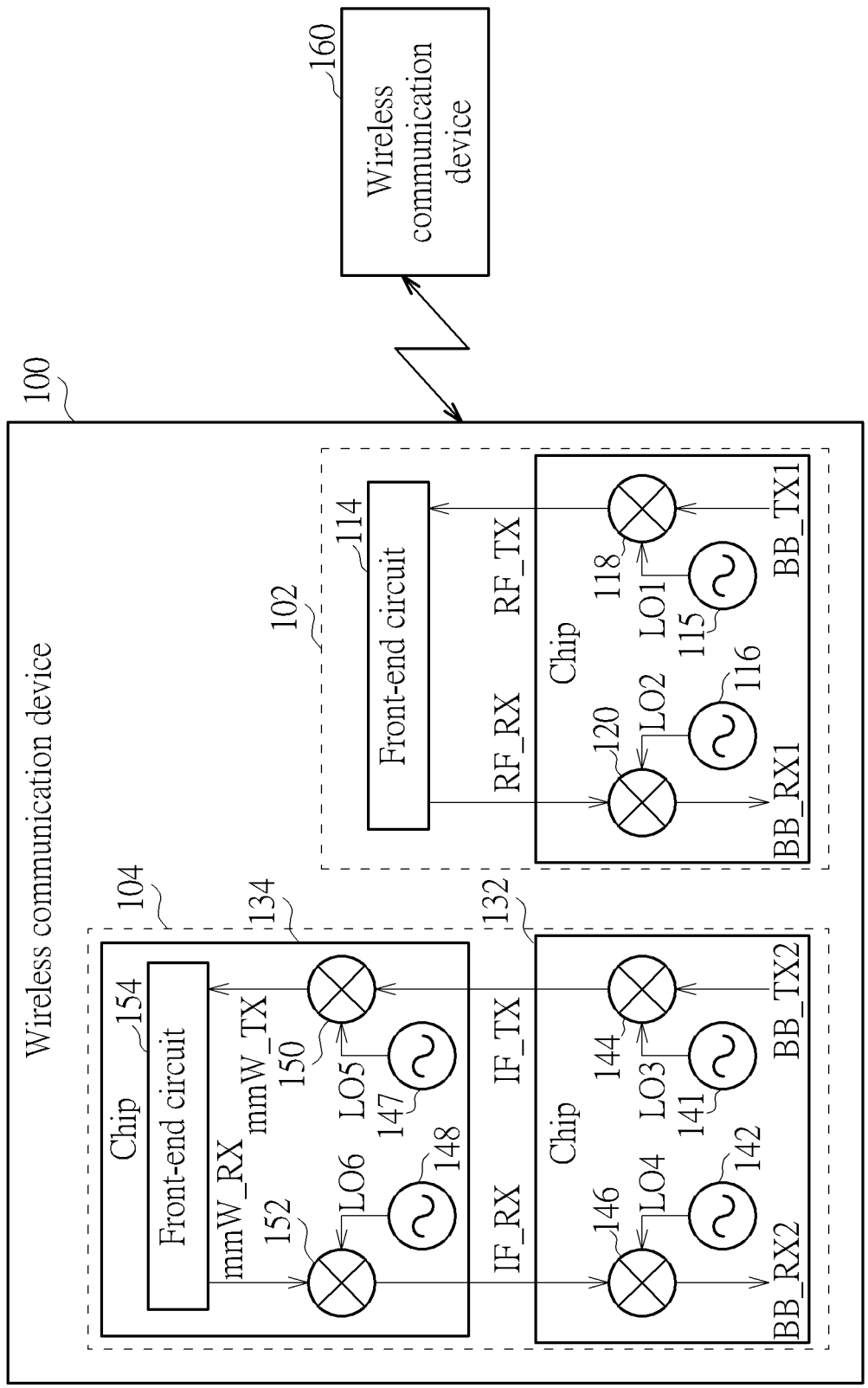
FIG. 1 is a diagram illustrating a wireless communication device with coexistence of multiple wireless communication systems according to an embodiment of the present invention.

FIG. 1 is a diagram illustrating a wireless communication device with coexistence of multiple wireless communication systems according to an embodiment of the present invention. The wireless communication device 100 includes a plurality of wireless communication systems coexisting in the same device. For example, one wireless communication system 102 is a 4G Long Term Evolution (LTE) system, and another wireless communication system 104 is a 5G New Radio (NR) Millimeter Wave (mmWave) system. For another example, one wireless communication system 102 is a 5G New Radio (NR) Sub-6 GHz system, and another wireless communication system 104 is a 5G NR Millimeter Wave (mmWave) system. For yet another example, one wireless communication system 102 is a combo system consisting of a 4G Long Term Evolution (LTE) system and a 5G New Radio (NR) Sub-6 GHz system that share the same transmit (TX) circuitry and receive (RX) circuitry, and another wireless communication system 104 is a 5G NR Millimeter Wave (mmWave) system.

The wireless communication device 100 communicates with another wireless communication device 160. In one exemplary implementation of the present invention, the wireless communication device 100 is a user equipment (UE), and the wireless communication device 160 is a base station (BS) such as a 5G gNodeB (gNB). Hence, the proposed spur avoidance technique is implemented in the UE. In another exemplary implementation of the present invention, the wireless communication device 160 is a user equipment (UE), and the wireless communication device 100 is a base station (BS) such as a 5G gNodeB (gNB). Hence, the proposed spur avoidance technique is implemented in the BS.

In this embodiment, the wireless communication system 102 includes a chip 112 and a front-end circuit 114. The front-end circuit 114 is a discrete circuit that is externally coupled to the chip 112. For example, the front-end circuit 114 is a radio frequency front-end (RFFE) that may include a TX front-end circuit, an RX front-end circuit, power amplifiers, external low-noise amplifiers (eLNAs), etc. The chip 112 includes a TX frequency synthesizer 115, an RX frequency synthesizer 116, an up-conversion circuit 118, and a down-conversion circuit 120, where the up-conversion circuit 118 is a part of the TX chain of the wireless communication system 102, and the down-conversion circuit 120 is a part of the RX chain of the wireless communication system 102. It should be noted that only the components pertinent to the present invention are illustrated. In practice, the chip 112 may include additional components required for achieving the designated TX function and RX function.

Regarding a TX mode of the wireless communication system 102, the up-conversion circuit 118 applies up-conversion to a TX signal BB_TX1 in the baseband by mixing the TX signal BB_TX1 with a local oscillator (LO) LO1 generated from the TX frequency synthesizer 115. Hence, the up-conversion circuit 118 up-converts the TX signal BB_TX1 in the baseband to generate a TX signal RF_TX with a carrier frequency f_RF1. The front-end circuit 114 (particularly, a TX front-end circuit included in the front-end circuit 114) transmits the TX signal RF_TX in the RF band to the wireless communication device 160 via an antenna (not shown).

Regarding an RX mode of the wireless communication system 102, the front-end circuit 114 (particularly, an RX front-end circuit included in the front-end circuit 114) receives an RX signal RF_RX with a carrier frequency f_RF2 from the wireless communication device 160 via an antenna (not shown). The down-conversion circuit 120 applies down-conversion to the RX signal RF_RX in the RF band by mixing the RX signal RF_RX with an LO signal LO2 generated from the RX frequency synthesizer 116. Hence, the down-conversion circuit 120 down-converts the RX signal RF_RX in the RF band to generate an RX signal BB_RX in the baseband.

The wireless communication system 104 may be a 5G NR mmWave system which transmits and receives wireless signals in the mmWave band. Since the frequency of wireless signals in the mmWave band is extremely high, a two-stage down-conversion scheme and a two-stage up-conversion scheme are employed. In this embodiment, the wireless communication system 104 includes two chips 132 and 134, wherein the chip 132 is responsible for the $2^{nd}$-stage down-conversion from intermediate frequency (IF) band to baseband and the $1^{st}$-stage up-conversion from baseband to IF band, and the chip 134 is responsible for the $1^{st}$-stage down-conversion from mmWave band to IF band and the $2^{nd}$-stage up-conversion from IF band to mmWave band.

The chip 132 includes a TX frequency synthesizer 141, an RX frequency synthesizer 142, an up-conversion circuit 144, and a down-conversion circuit 146, where the up-conversion circuit 144 is a part of the TX chain of the wireless communication system 104, and the down-conversion circuit 146 is a part of the RX chain of the wireless communication system 104.

The chip 134 includes a TX frequency synthesizer 147, an RX frequency synthesizer 148, an up-conversion circuit 150, a down-conversion circuit 152, and a front-end circuit 154. The front-end circuit 154 may include a TX front-end circuit, an RX front-end circuit, power amplifiers, low-noise amplifiers, etc. The up-conversion circuit 150 is a part of the TX chain of the wireless communication system 104. The down-conversion circuit 152 is a part of the RX chain of the wireless communication system 104.

It should be noted that only the components pertinent to the present invention are illustrated. In practice, the chip 132 may include additional components required for achieving the designated TX function and RX function, and the chip 134 may include additional components required for achieving the designated TX function and RX function.

Regarding a TX mode of the wireless communication system 104, the up-conversion circuit 144 applies up-conversion to a TX signal BB_TX2 in the baseband by mixing the TX signal BB_TX2 with an LO signal LO3 generated from the TX frequency synthesizer 141. Hence, the up-conversion circuit 144 up-converts the TX signal BB_TX2 in the baseband to generate a TX signal IF_TX with a carrier frequency f_IF1. Next, the up-conversion circuit 150 applies up-conversion to the TX signal IF_TX in the IF band by mixing the TX signal IF_TX with an LO signal LO5 generated from the TX frequency synthesizer 147. Hence, the up-conversion circuit 150 up-converts the TX signal IF_TX in the IF band to generate a TX signal mmW_TX with a carrier frequency f_mmW1. The front-end circuit 154 (particularly, a TX front-end circuit included in the front-end circuit 154) transmits the TX signal mmW_TX in the mmWave band to the wireless communication device 160 via an antenna (not shown).

Regarding an RX mode of the wireless communication system 104, the front-end circuit 154 (particularly, an RX front-end circuit included in the front-end circuit 154) receives an RX signal mmW_RX with the carrier frequency f_mmW2 from the wireless communication device 160 via an antenna (not shown). The down-conversion circuit 152 applies down-conversion to the RX signal mmW_RX in the mmWave band by mixing the RX signal mmW_RX with an LO signal LO6 generated from the RX frequency synthesizer 148. Hence, the down-conversion circuit 152 down-converts the RX signal mmW_RX in the mmWave band to generate an RX signal IF_RX with the carrier frequency f_IF2. Next, the down-conversion circuit 146 applies down-conversion to the RX signal IF_RX in the IF band by mixing the RX signal IF_RX with an LO signal LO4 generated from the RX frequency synthesizer 142. Hence, the down-conversion circuit 146 down-converts the RX signal IF_RX in the IF band to generate an RX signal BB_RX2 in the baseband.

The wireless communication system 102 (e.g., 4G LTE system and/or 5G NR sub-6 GHz system) and the wireless communication system 104 (e.g., 5G NR mmWave system) may suffer from mutual desensitization due to coexistence of multiple wireless communication systems in the same wireless communication device 100. In general, RX desensitization of one wireless communication system is caused by fundamental spurs and/or harmonic spurs leaked from another wireless communication system via electromagnetic (EM) paths. For example, the minimum power of the RX signal RF_RX may be −110 dBm, and the maximum power of the TX signal IF_TX may be −3 dBm. Since the required isolation between the RX signal RF_RX and the TX signal IF_TX is more than 100 dB, the internal filter with limited isolation capability is unable to meet the isolation requirement. As a result, RX desensitization of the wireless communication system 102 (e.g., 4G LTE system and/or 5G NR sub-6 GHz system) is caused by the IF output of the TX chain in the wireless communication system 104 (e.g., 5G NR mmWave system), if the proposed spur avoidance technique is not employed. For another example, the minimum power of the RX signal IF_RX may be −73 dBm, and the maximum power of the TX signal RF_TX may be 27 dBm. Since the required isolation between the RX signal IF_RX and the TX signal RF_TX is approximately 100 dB, the internal filter with limited isolation capability is unable to meet the isolation requirement. As a result, RX desensitization of the wireless communication system 104 (e.g., 5G NR mmWave system) is caused by the RF output of the TX chain in the wireless communication system 102 (e.g., 4G LTE system and/or 5G NR sub-6 GHz system), if the proposed spur avoidance technique is not employed.

To address the above RX desensitization issue, the present invention proposes using a spur avoidance technique to properly set the carrier frequency f_IF adopted by the wireless communication system 104 (e.g., 5G NR mmWave system). In a case where each of carrier frequencies f_IF1 and f_IF2 is within a spur-free IF range, the wireless communication system 102 (e.g., 4G LTE system and/or 5G NR sub-6 GHz system) can operate without spur-induced RX desensitization, and the wireless communication system 104 (e.g., 5G NR mmWave system) can operate without spur-induced RX desensitization. For example, the carrier frequency f_RF1/f_RF2 is within one of different bands that are selectable at the wireless communication system 102 and are supported by the wireless communication device 160, and the carrier frequency f_IF1/f_IF2 is set by a selected IF value that ensures that the carrier frequency f_IF1/f_IF2 is different from all fundamental frequencies (i.e., $1^{st}$-order harmonic frequencies) included in a band combination that is employed at the wireless communication system 102. Further details of the proposed spur avoidance technique are described as below.

In some embodiments of the present invention, the proposed spur avoidance technique is implemented in a user equipment (UE). Consider a case where the wireless communication device 100 is a UE, the wireless communication device 160 is a BS, the wireless communication system 102 is a 4G LTE system and/or 5G NR sub-6 GHz system, and the wireless communication system 104 is a 5G NR mmWave system. Regarding the wireless communication device 100 being a UE, the wireless communication system 102 transmits data to the wireless communication device 160 via an uplink (UL), and the wireless communication system 104 receives data from the wireless communication device 160 via a downlink (DL). The carrier frequency f_RF1 associated with the TX signal RF_TX is within one of different UL bands that are selectable at the wireless communication system 102 and are supported by the wireless communication device 160. For example, different UL bands selectable at the wireless communication system 102 (which is a UE) are listed in the following table.

TABLE 1

| Band | UL low (MHz) | UL high (MHz) |
|---|---|---|
| 1 | 1920 | 1980 |
| 2 | 1850 | 1910 |
| 3 | 1710 | 1785 |
| 5 | 824 | 849 |
| 7 | 2500 | 2570 |
| 8 | 880 | 915 |
| 11 | 1427.9 | 1447.9 |
| 12 | 699 | 716 |
| 18 | 815 | 830 |
| 19 | 830 | 845 |
| 20 | 832 | 862 |
| 21 | 1447.9 | 1462.9 |
| 26 | 814 | 849 |
| 28 | 703 | 748 |
| 30 | 2305 | 2315 |
| 39 | 1880 | 1920 |
| 41 | 2496 | 2690 |
| 42 | 3400 | 3600 |
| 66 | 1710 | 1780 |
| LAA | 5150 | 5925 |
| 71 | 663 | 698 |
| n77 | 3300 | 4200 |
| n79 | 4400 | 5000 |

An UL band combination consisting of one or more UL bands may be employed by the wireless communication system 102 for data transmission from the wireless communication system 102 to the wireless communication device 160. Hence, the carrier frequency f_RF1 associated with the TX signal RF_TX is selected from fundamental frequencies within the UL band combination. To protect the wireless communication system 104 (e.g., 5G NR mmWave system) from RX desensitization caused by the RF output of the TX chain in the wireless communication system 102 (e.g., 4G LTE system and/or 5G NR sub-6 GHz system), the carrier frequency f_IF2 associated with the RX signal IF_RX should be properly selected. For example, the carrier frequency f_IF2 is intentionally set to be different from all fundamental frequencies included in the UL band combination employed by the wireless communication system 102.

Figure 2:
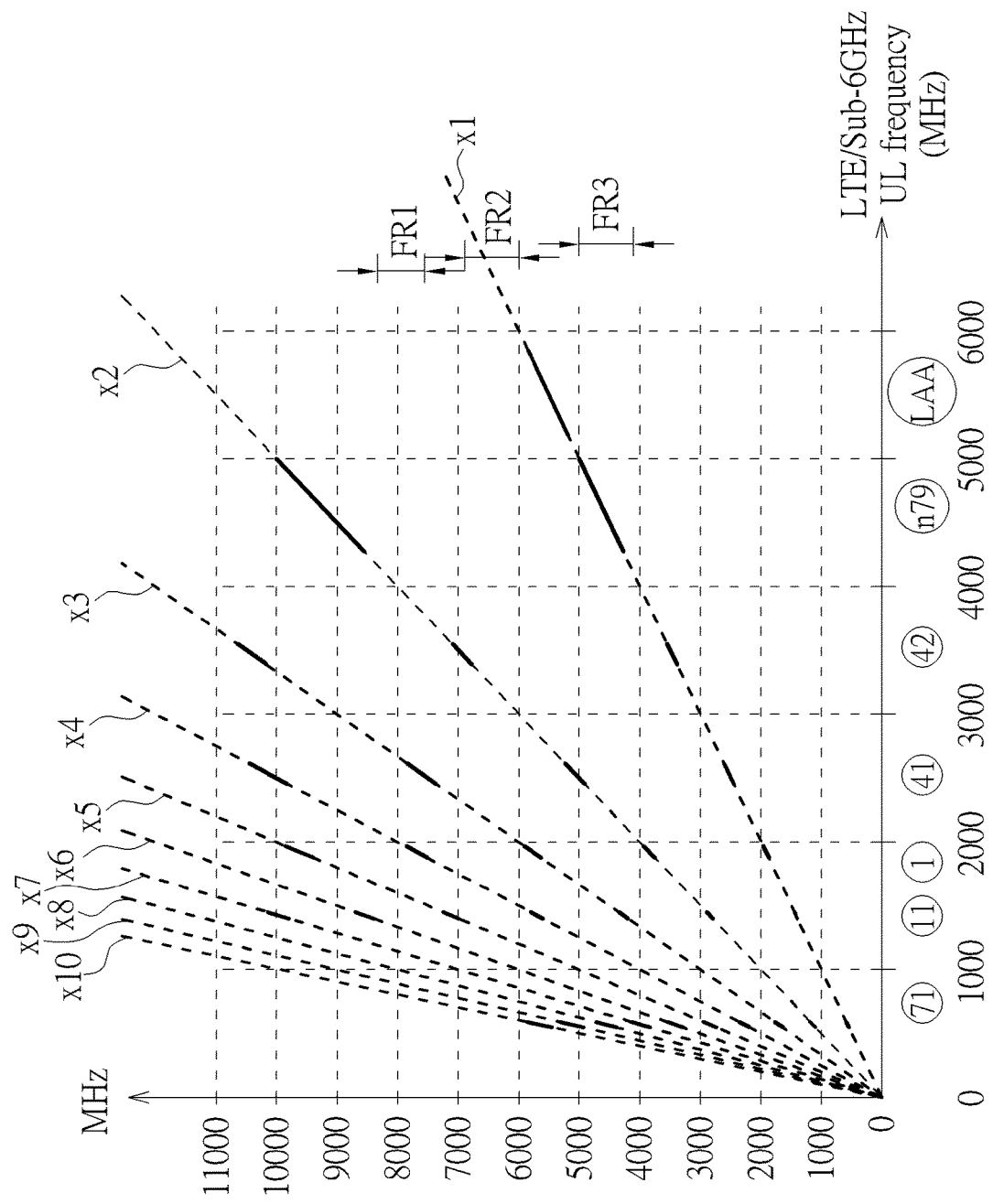
FIG. 2 is a diagram illustrating a selection of an IF range for protecting a wireless communication system (e.g., 5G NR mmWave system) from RX desensitization caused by an RF output of a TX chain in a coexisting wireless communication system (e.g., 4G LTE system and/or 5GNR sub-6 GHz system) according to an embodiment of the present invention.

FIG. 2 is a diagram illustrating a selection of an IF range for protecting a wireless communication system (e.g., 5G NR mmWave system) from RX desensitization caused by an RF output of a TX chain in a coexisting wireless communication system (e.g., 4G LTE system and/or 5GNR sub-6 GHz system) according to an embodiment of the present invention. Suppose that a UL band combination employed by the wireless communication system 102 and supported by the wireless communication device 160 includes band 71 (663-698 MHz), band 11 (1427.9-1447.9 MHz), band 1 (1920-1980 MHz), band 41 (2496-2690 MHz), band 42 (3400-3600 MHz), band n79 (4400-5000 MHz) and Licensed Assisted Access (LAA) band (5150-5925 MHz).

The fundamental frequencies (i.e., $1^{st}$-order harmonic frequencies) of one UL band are distributed along a characteristic curve labeled by "x1". The $N^{th}$-order harmonic frequencies of one UL band are distributed along a characteristic curve labeled by "xN", where N={2, 3, 4, 5, 6, 7, 8, 9, 10}. For example, the $2^{nd}$-order harmonic frequencies of one UL band are distributed along a characteristic curve labeled by "x2", the $3^{rd}$-order harmonic frequencies of one UL band are distributed along a characteristic curve labeled by "x3", and so on.

As known to those skilled in the pertinent art, the power of a fundamental tone (i.e., $1^{st}$-order harmonic tone) is higher than that of a $2^{nd}$-order harmonic tone, the power of the $2^{nd}$-order harmonic tone is higher than that of a $3^{rd}$-order harmonic tone, and the power of higher-order harmonic tones is insignificant. In other words, the fundamental tone is the dominant spur source. As shown in FIG. 2, none of the fundamental frequencies included in band 71 (663-698 MHz), band 11 (1427.9-1447.9 MHz), band 1 (1920-1980 MHz), band 41 (2496-2690 MHz), band 42 (3400-3600 MHz), band n79 (4400-5000 MHz) and LAA band (5150-5925 MHz) is within a frequency range FR1 that is between 7.4 GHz and 8.2 GHz. Hence, the frequency range FR1 can be used by the coexisting wireless communication system 104 for avoidance of RX desensitization. That is, the wireless communication system 104 is configured to set the carrier frequency f_IF2 associated with the RX signal IF_RX by a frequency value that is selected from the frequency range FR1 (7.4-8.2 GHz).

As shown in FIG. 2, none of the fundamental frequencies included in band 71 (663-698 MHz), band 11 (1427.9-1447.9 MHz), band 1 (1920-1980 MHz), band 41 (2496-2690 MHz), band 42 (3400-3600 MHz), band n79 (4400-5000 MHz) and LAA band (5150-5925 MHz) is within a frequency range FR2 that is between 6 GHz and 6.8 GHz. Alternatively, the frequency range FR2 can be used by the coexisting wireless communication system 104 for avoidance of RX desensitization. That is, the wireless communication system 104 is configured to set the carrier frequency f_IF2 associated with the RX signal IF_RX by a frequency value that is selected from the frequency range FR2 (6-6.8 GHz).

It should be noted that the band n79 may be used in some countries, and may not be used in other countries. When the wireless communication devices 100 and 160 are used in a country in which the band n79 can be selected and used, the wireless communication system 104 may be configured to set the carrier frequency f_IF2 associated with the RX signal IF_RX by a frequency value that is selected from the frequency range FR1 (7.4-8.2 GHz) or the frequency range FR2 (6-6.8 GHz).

When the wireless communication devices 100 and 160 are used in a country in which the band n79 cannot be selected and used, the wireless communication system 104 may be configured to set the carrier frequency f_IF2 associated with the RX signal IF_RX by a frequency value that is selected from the frequency range FR1 (7.4-8.2 GHz), the frequency range FR2 (6-6.8 GHz), or the frequency range FR3 (4.2-5 GHz). Suppose that a UL band combination employed by the wireless communication system 102 and the wireless communication device 160 includes band 71 (663-698 MHz), band 11 (1427.9-1447.9 MHz), band 1 (1920-1980 MHz), band 41 (2496-2690 MHz), band 42 (3400-3600 MHz), and LAA band (5150-5925 MHz). Since the band n79 (4400-5000 MHz) cannot be selected and used, none of the fundamental frequencies included in band 71 (663-698 MHz), band 11 (1427.9-1447.9 MHz), band 1 (1920-1980 MHz), band 41 (2496-2690 MHz), band 42 (3400-3600 MHz), and LAA band (5150-5925 MHz) is within the frequency range FR3 that is between 4.2 GHz and 5 GHz. Hence, the frequency range FR3 can be used by the coexisting wireless communication system 104 for avoidance of RX desensitization. That is, the wireless communication system 104 can be configured to set the carrier frequency f_IF2 associated with the RX signal IF_RX by a frequency value that is selected from the frequency range FR3 (4.2-5 GHz). Since frequencies included in the frequency range FR3 are lower than that included in frequency ranges FR1 and FR2, setting the carrier frequency f_IF2 associated with the RX signal IF_RX by a frequency value that is selected from the frequency range FR3 (4.2-5 GHz) is good for power saving and is capable of providing good noise performance.

It should be noted that the UL band combination shown in FIG. 2 is for illustrative purposes only, and is not meant to be a limitation of the present invention. In practice, the wireless communication system 102 (e.g., 4G LTE system and/or 5G NR sub-6 GHz system) is allowed to employ an UL band combination different from that shown in FIG. 2. In accordance with the proposed spur avoidance technique, the wireless communication system 104 (e.g., 5G NR mmWave system) can be configured to set the carrier frequency f_IF2 associated with the RX signal IF_RX by a frequency value that is selected from one of the frequency ranges FR1-FR3, depending upon actual design considerations.

Consider another case where the wireless communication device 100 is a UE, the wireless communication device 160 is a BS, the wireless communication system 102 is a 4G LTE system/5G NR sub-6 GHz system, the wireless communication system 104 is a 5G NR mmWave system, the wireless communication system 102 receives data from the wireless communication device 160 via a downlink (DL), and the wireless communication system 104 transmits data to the wireless communication device 160 via an uplink (UL). The carrier frequency f_RF2 associated with the RX signal RF_RX is within one of different DL bands that are selectable at the wireless communication system 102 and are supported by the wireless communication device 160. For example, different DL bands selectable at the wireless communication system 102 (which is a UE) are listed in the following table.

TABLE 2

| Band | DL low (MHz) | DL high (MHz) |
| --- | --- | --- |
| 1 | 2110 | 2170 |
| 2 | 1930 | 1990 |
| 3 | 1805 | 1880 |
| 5 | 869 | 894 |
| 7 | 2620 | 2690 |
| 8 | 925 | 960 |
| 11 | 1475.9 | 1495.9 |
| 12 | 729 | 746 |
| 18 | 860 | 875 |
| 19 | 875 | 890 |
| 20 | 791 | 821 |
| 21 | 1495.9 | 1510.9 |
| 26 | 859 | 894 |
| 28 | 758 | 803 |
| 30 | 2350 | 2360 |
| 39 | 1880 | 1920 |
| 41 | 2496 | 2690 |
| 42 | 3400 | 3600 |
| 66 | 2110 | 2200 |
| LAA | 5150 | 5925 |
| 71 | 617 | 652 |
| n77 | 3300 | 4200 |
| n79 | 4400 | 5000 |

A DL band combination consisting of one or more DL bands may be employed by the wireless communication system 102 for data reception from the wireless communication device 160. Hence, the carrier frequency f_RF2 associated with the RX signal RF_RX is selected from fundamental frequencies within the DL band combination.

The carrier frequency f_RF2 of the RX signal RF_RX is the same as a fundamental frequency of the LO signal LO2 generated from the RX frequency synthesizer 116. When the carrier frequency f_IF1 associated with the TX signal IF_TX of the wireless communication system 104 is equal to the fundamental frequency (i.e., $1^{st}$-order harmonic frequency) or an $N^{th}$-order harmonic frequency (N>1) of the LO signal LO2 used by down-conversion circuit 120 of the wireless communication system 102, the harmonic downconversion (i.e., harmonic mixing) at the down-conversion circuit 120 may lead to RX desensitization of the wireless communication system 102. To protect the wireless communication system 102 (e.g., 4G LTE system and/or 5G NR sub-6 GHz system) from RX desensitization caused by the IF output of the TX chain in the wireless communication system 104 (e.g., 5G NR mmWave system), the carrier frequency f_IF1 associated with the TX signal IF_TX should be properly selected. For example, the carrier frequency f_IF1 is intentionally set to be different from all fundamental frequencies included in the DL band combination employed by the wireless communication system 102.

Figure 3:
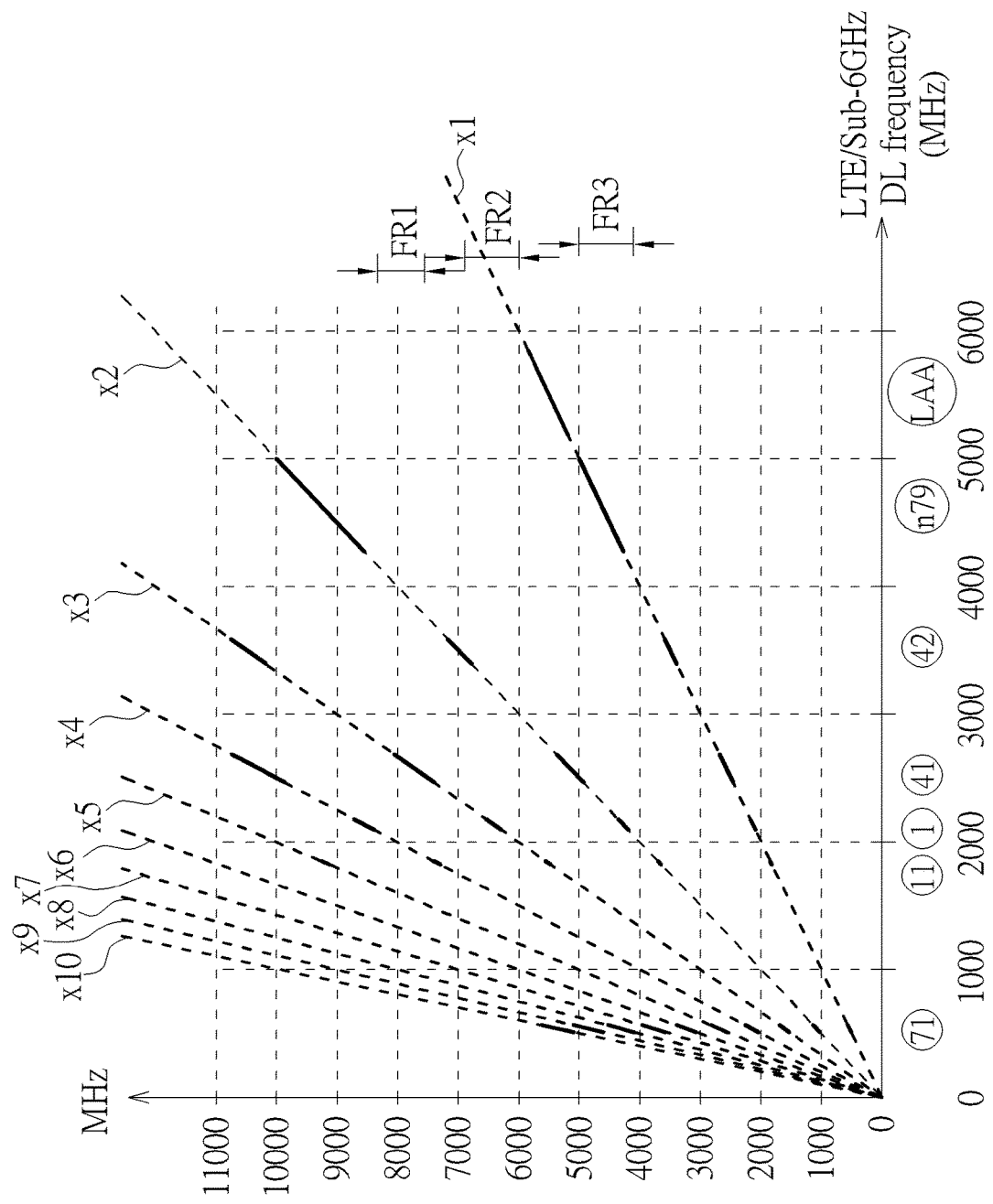
FIG. 3 is a diagram illustrating a selection of an IF range for protecting a wireless communication system (e.g., 4G LTE system and/or 5G NR sub-6 GHz system) from RX desensitization caused by an IF output of a TX chain in a coexisting wireless communication system (e.g., 5G NR mmWave system) according to an embodiment of the present invention.

FIG. 3 is a diagram illustrating a selection of an IF range for protecting a wireless communication system (e.g., 4G LTE system and/or 5G NR sub-6 GHz system) from RX desensitization caused by an IF output of a TX chain in a coexisting wireless communication system (e.g., 5G NR mmWave system) according to an embodiment of the present invention. Suppose that a DL band combination employed by the wireless communication system 102 and supported by the wireless communication device 160 includes band 71 (617-652 MHz), band 11 (1475.9-1495.9 MHz), band 1 (2110-2170 MHz), band 41 (2496-2690 MHz), band 42 (3400-3600 MHz), band n79 (4400-5000 MHz) and LAA band (5150-5925 MHz).

The fundamental frequencies (i.e., $1^{st}$-order harmonic frequencies) of one DL band are distributed along a characteristic curve labeled by "x1". The $N^{th}$-order harmonic frequencies of one DL band are distributed along a characteristic curve labeled by "xN", where N={2, 3, 4, 5, 6, 7, 8, 9, 10}. For example, the $2^{nd}$-order harmonic frequencies of one DL band are distributed along a characteristic curve labeled by "x2", the $3^{rd}$-order harmonic frequencies of one DL band are distributed along a characteristic curve labeled by "x3", and so on.

As known to those skilled in the pertinent art, the power of even-order harmonic mixing is insignificant. Regarding the odd-order harmonic mixing, the power of fundamental mixing (i.e., $1^{st}$-order harmonic mixing) is higher than that of $3^{rd}$-order harmonic mixing, and the power of higher-order harmonic mixing is insignificant. In other words, the fundamental tone is the dominant spur source. As shown in FIG. 3, none of the fundamental frequencies included in band 71 (617-652 MHz), band 11 (1475.9-1495.9 MHz), band 1 (2110-2170 MHz), band 41 (2496-2690 MHz), band 42 (3400-3600 MHz), band n79 (4400-5000 MHz) and LAA band (5150-5925 MHz) is within a frequency range FR1 that is between 7.4 GHz and 8.2 GHz. Hence, the frequency range FR1 can be used by the coexisting wireless communication system 104 for avoidance of RX desensitization at the wireless communication system 102. That is, the wireless communication system 104 is configured to set the carrier frequency f_IF1 associated with the TX signal IF_TX by a frequency value that is selected from the frequency range FR1 (7.4-8.2 GHz).

As shown in FIG. 3, none of the fundamental frequencies included in band 71 (617-652 MHz), band 11 (1475.9-1495.9 MHz), band 1 (2110-2170 MHz), band 41 (2496-2690 MHz), band 42 (3400-3600 MHz), band n79 (4400-5000 MHz) and LAA band (5150-5925 MHz) is within a frequency range FR2 that is between 6 GHz and 6.8 GHz. Alternatively, the frequency range FR2 can be used by the coexisting wireless communication system 104 for avoidance of RX desensitization at the wireless communication system 102. That is, the wireless communication system 104 is configured to set the carrier frequency f_IF1 associated with the TX signal IF_TX by a frequency value that is selected from the frequency range FR2 (6-6.8 GHz).

It should be noted that the band n79 may be used in some countries, and may not be used in other countries. When the wireless communication devices 100 and 160 are used in a country in which the band n79 can be selected and used, the wireless communication system 104 may be configured to set the carrier frequency f_IF1 associated with the TX signal IF_TX by a frequency value that is selected from the frequency range FR1 (7.4-8.2 GHz) or the frequency range FR2 (6-6.8 GHz).

When the wireless communication devices 100 and 160 are used in a country in which the band n79 cannot be selected and used, the wireless communication system 104 may be configured to set the carrier frequency f_IF1 associated with the TX signal IF_TX by a frequency value that is selected from the frequency range FR1 (7.4-8.2 GHz), the frequency range FR2 (6-6.8 GHz), or the frequency range FR3 (4.2-5 GHz). Suppose that a DL band combination employed by the wireless communication system 102 and supported by the wireless communication device 160 includes band 71 (617-652 MHz), band 11 (1475.9-1495.9 MHz), band 1 (2110-2170 MHz), band 41 (2496-2690 MHz), band 42 (3400-3600 MHz), and LAA band (5150-5925 MHz). Since the band n79 (4400-5000 MHz) cannot be selected and used, none of the fundamental frequencies included in band 71 (617-652 MHz), band 11 (1475.9-1495.9 MHz), band 1 (2110-2170 MHz), band 41 (2496-2690 MHz), band 42 (3400-3600 MHz), and LAA band (5150-5925 MHz) is within the frequency range FR3 that is between 4.2 GHz and 5 GHz. Hence, the frequency range FR3 can be used by the coexisting wireless communication system 104 for avoidance of RX desensitization at the wireless communication system 102. That is, the wireless communication system 104 is configured to set the carrier frequency f_IF1 associated with the TX signal IF_TX by a frequency value that is selected from the frequency range FR3 (4.2-5 GHz). Since frequencies included in the frequency range FR3 are lower than that included in frequency ranges FR1 and FR2, setting the carrier frequency f_IF1 associated with the TX signal IF_TX by a frequency value that is selected from the frequency range FR3 (4.2-5 GHz) is good for power saving and is capable of providing good noise performance.

It should be noted that the DL band combination shown in FIG. 3 is for illustrative purposes only, and is not meant to be a limitation of the present invention. In practice, the wireless communication system 102 (e.g., 4G LTE system and/or 5G NR Sub-6 GHz system) is allowed to employ a DL band combination different from that shown in FIG. 2. In accordance with the proposed spur avoidance technique, the wireless communication system 104 (e.g., 5G NR mmWave system) can be configured to set the carrier frequency f_IF1 associated with the TX signal IF_TX by a frequency value that is selected from one of the frequency ranges FR1-FR3, depending upon actual design considerations.

In some embodiments of the present invention, the proposed spur avoidance technique is implemented in a base station (BS) such as a 5G gNodeB (gNB). Consider a case where the wireless communication device 100 is a BS, the wireless communication device 160 is a UE, the wireless communication system 102 is a 4G LTE system/5G NR sub-6 GHz system, the wireless communication system 104 is a 5G NR mmWave system, the wireless communication system 102 transmits data to the wireless communication device 160 via an uplink (UL), and the wireless communication system 104 receives data from the wireless communication device 160 via a downlink (DL). The carrier frequency f_RF1 associated with the TX signal RF_TX is within one of different UL bands that are selectable at the wireless communication system 102 and are supported by the wireless communication device 160. For example, different UL bands selectable at the wireless communication system 102 (which is a BS) are listed in the following table.

TABLE 3

| Band | UL low (MHz) | UL high (MHz) |
|---|---|---|
| 1 | 2110 | 2170 |
| 2 | 1930 | 1990 |
| 3 | 1805 | 1880 |
| 5 | 869 | 894 |
| 7 | 2620 | 2690 |
| 8 | 925 | 960 |
| 11 | 1475.9 | 1495.9 |
| 12 | 729 | 746 |
| 18 | 860 | 875 |
| 19 | 875 | 890 |
| 20 | 791 | 821 |
| 21 | 1495.9 | 1510.9 |
| 26 | 859 | 894 |
| 28 | 758 | 803 |
| 30 | 2350 | 2360 |
| 39 | 1880 | 1920 |
| 41 | 2496 | 2690 |
| 42 | 3400 | 3600 |
| 66 | 2110 | 2200 |

TABLE 3-continued

| Band | UL low (MHz) | UL high (MHz) |
|---|---|---|
| LAA | 5150 | 5925 |
| 71 | 617 | 652 |
| n77 | 3300 | 4200 |
| n79 | 4400 | 5000 |

It should be noted that an UL frequency used by the BS for transmitting data to the UE is the same as a DL frequency used by the UE for receiving data from the BS. Hence, the UL bands for BS as listed in table 3 are same as the DL bands for UE as listed in table 2. To protect the wireless communication system 104 (e.g., 5G NR mmWave system) from RX desensitization caused by the RF output of the TX chain in the wireless communication system 102 (e.g., 4G LTE system and/or 5G NR sub-6 GHz system), the carrier frequency f_IF2 associated with the RX signal IF_RX should be properly selected. For example, the carrier frequency f_IF2 is intentionally set to be different from all fundamental frequencies included in the UL band combination employed by the wireless communication system 102.

Since an UL frequency used by the BS for transmitting data to the UE is same as a DL frequency used by the UE for receiving data from the BS, a selection of an IF range for protecting a wireless communication system (e.g., 5G NR mmWave system) from RX desensitization caused by an RF output of a TX chain in a coexisting wireless communication system (e.g., 4G LTE system and/or 5G NR sub-6 GHz system) is illustrated in FIG. 3. When the wireless communication devices 100 and 160 are used in a country in which the band n79 can be selected and used, the wireless communication system 104 may be configured to set the carrier frequency f_IF2 associated with the RX signal IF_RX by a frequency value that is selected from the frequency range FR1 (7.4-8.2 GHz) or the frequency range FR2 (6-6.8 GHz). When the wireless communication devices 100 and 160 are used in a country in which the band n79 cannot be selected and used, the wireless communication system 104 may be configured to set the carrier frequency f_IF2 associated with the RX signal IF_RX by a frequency value that is selected from the frequency range FR1 (7.4-8.2 GHz), the frequency range FR2 (6-6.8 GHz), or the frequency range FR3 (4.2-5 GHz). Compared to the frequency range FR1 (7.4-8.2 GHz) and the frequency range FR2 (6-6.8 GHz), the frequency range FR3 is good for power saving and is capable of providing good noise performance.

Consider another case where the wireless communication device 100 is a BS, the wireless communication device 160 is a UE, the wireless communication system 102 is a 4G LTE system/5G NR sub-6 GHz system, the wireless communication system 104 is a 5G NR mmWave system, the wireless communication system 102 receives data from the wireless communication device 160 via a downlink (DL), and the wireless communication system 104 transmits data to the wireless communication device 160 via an uplink (UL). The carrier frequency f_RF2 associated with the RX signal RF_RX is within one of different DL bands that are selectable at the wireless communication system 102 and are supported by the wireless communication device 160. For example, different DL bands selectable at the wireless communication system 102 (which is a BS) are listed in the following table.

TABLE 4

| Band | DL low (MHz) | DL high (MHz) |
| --- | --- | --- |
| 1 | 1920 | 1980 |
| 2 | 1850 | 1910 |
| 3 | 1710 | 1785 |
| 5 | 824 | 849 |
| 7 | 2500 | 2570 |
| 8 | 880 | 915 |
| 11 | 1427.9 | 1447.9 |
| 12 | 699 | 716 |
| 18 | 815 | 830 |
| 19 | 830 | 845 |
| 20 | 832 | 862 |
| 21 | 1447.9 | 1462.9 |
| 26 | 814 | 849 |
| 28 | 703 | 748 |
| 30 | 2305 | 2315 |
| 39 | 1880 | 1920 |
| 41 | 2496 | 2690 |
| 42 | 3400 | 3600 |
| 66 | 1710 | 1780 |
| LAA | 5150 | 5925 |
| 71 | 663 | 698 |
| n77 | 3300 | 4200 |
| n79 | 4400 | 5000 |

It should be noted that a DL frequency used by the BS for receiving data from the UE is the same as an UL frequency used by the UE for transmitting data to the BS. Hence, the DL bands for BS as listed in table 4 are same as the UL bands for UE as listed in table 1. To protect the wireless communication system 102 (e.g., 4G LTE system and/or 5G NR sub-6 GHz system) from RX desensitization caused by the IF output of the TX chain in the wireless communication system 104 (e.g., 5G NR mmWave system), the carrier frequency f_IF1 associated with the TX signal IF_TX should be properly selected. For example, the carrier frequency f_IF1 is intentionally set to be different from all fundamental frequencies included in the DL band combination employed by the wireless communication system 102 and supported by the wireless communication device 160.

Since a DL frequency used by the BS for receiving data from the UE is same as an UL frequency used by the UE for transmitting data to the BS, a selection of an IF range for protecting a wireless communication system (e.g., 4G LTE system/5GNR sub-6 GHz system) from RX desensitization caused by an IF output of a TX chain in a coexisting wireless communication system (e.g., 5G NR mmWave system) is illustrated in FIG. 2. When the wireless communication devices 100 and 160 are used in a country in which the band n79 can be selected and used, the wireless communication system 104 may be configured to set the carrier frequency f_IF1 associated with the TX signal IF_TX by a frequency value that is selected from the frequency range FR1 (7.4-8.2 GHz) or the frequency range FR2 (6-6.8 GHz). When the wireless communication devices 100 and 160 are used in a country in which the band n79 cannot be selected and used, the wireless communication system 104 may be configured to set the carrier frequency f_IF1 associated with the TX signal IF_TX by a frequency value that is selected from the frequency range FR1 (7.4-8.2 GHz), the frequency range FR2 (6-6.8 GHz), or the frequency range FR3 (4.2-5 GHz). Compared to the frequency range FR1 (7.4-8.2 GHz) and the frequency range FR2 (6-6.8 GHz), the frequency range FR3 is good for power saving and is capable of providing good noise performance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication device with coexistence of multiple wireless communication systems comprising:
    a first wireless communication system, comprising:
        an up-conversion circuit, arranged to up-convert a first transmit (TX) signal in a baseband to generate a second TX signal with a first carrier frequency; and
        a front-end circuit, arranged to transmit the second TX signal to another wireless communication device, wherein the first carrier frequency is within a band combination that is employed at the first wireless communication system and is supported by said another wireless communication device; and
    a second wireless communication system, comprising:
        a first down-conversion circuit, arranged to down-convert a first receive (RX) signal with a second carrier frequency to generate a second RX signal with a third carrier frequency; and
        a second down-conversion circuit, arranged to down-convert the second RX signal with the third carrier frequency to generate a third RX signal in the baseband;
    wherein the third carrier frequency is different from all fundamental frequencies included in the band combination; and the wireless communication device has pre-defined frequency planning that ensures the third carrier frequency is not a selectable fundamental frequency at the first wireless communication system, such that the up-conversion circuit outputs no TX signal with the third carrier frequency.

2. The wireless communication device of claim 1, wherein the first wireless communication system is a 4G Long Term Evolution (LTE) system, and the second wireless communication system is a 5G New Radio (NR) Millimeter Wave (mmWave) system.

3. The wireless communication device of claim 2, wherein the third carrier frequency is within a frequency range that is between 7.4 GHz and 8.2 GHz.

4. The wireless communication device of claim 2, wherein the third carrier frequency is within a frequency range that is between 4.2 GHz and 5 GHz.

5. The wireless communication device of claim 2, wherein the third carrier frequency is within a frequency range that is between 6 GHz and 6.8 GHz.

6. The wireless communication device of claim 1, wherein the first wireless communication system is a 5G New Radio (NR) Sub-6 GHz system, and the second wireless communication system is a 5G NR Millimeter Wave (mmWave) system.

7. The wireless communication device of claim 6, wherein the third carrier frequency is within a frequency range that is between 7.4 GHz and 8.2 GHz.

8. The wireless communication device of claim 6, wherein the third carrier frequency is within a frequency range that is between 4.2 GHz and 5 GHz.

9. The wireless communication device of claim 6, wherein the third carrier frequency is within a frequency range that is between 6 GHz and 6.8 GHz.

10. The wireless communication device of claim 1, wherein the wireless communication device is a user equipment (UE).

11. A wireless communication device with coexistence of multiple wireless communication systems comprising:

a first wireless communication system, comprising:
- a front-end circuit, arranged to receive a first receive (RX) signal with a first carrier frequency from another wireless communication device, wherein the first carrier frequency is within a band combination that is employed at the first wireless communication system and is supported by said another wireless communication device; and
- a down-conversion circuit, arranged to down-convert the first RX signal with the first carrier frequency to generate a second RX signal in a baseband; and a second wireless communication system, comprising:
- a first up-conversion circuit, arranged to up-convert a first transmit (TX) signal in the baseband to generate a second TX signal with a second carrier frequency; and
- a second up-conversion circuit, arranged to up-convert the second TX signal with the second carrier frequency to generate a third TX signal with a third carrier frequency;

wherein the second carrier frequency is different from all fundamental frequencies included in the band combination; and the wireless communication device has pre-defined frequency planning that ensures the second carrier frequency is not a selectable fundamental frequency at the first wireless communication system, such that the down-conversion circuit receives no RX signal with the second carrier frequency.

12. The wireless communication device of claim 11, wherein the first wireless communication system is a 4G Long Term Evolution (LTE) system, and the second wireless communication system is a 5G New Radio (NR) Millimeter Wave (mmWave) system.

13. The wireless communication device of claim 12, wherein the second carrier frequency is within a frequency range that is between 7.4 GHz and 8.2 GHz.

14. The wireless communication device of claim 12, wherein the second carrier frequency is within a frequency range that is between 4.2 GHz and 5 GHz.

15. The wireless communication device of claim 12, wherein the second carrier frequency is within a frequency range that is between 6 GHz and 6.8 GHz.

16. The wireless communication device of claim 11, wherein the first wireless communication system is a 5G New Radio (NR) Sub-6 GHz system, and the second wireless communication system is a 5G NR Millimeter Wave (mmWave) system.

17. The wireless communication device of claim 16, wherein the second carrier frequency is within a frequency range that is between 7.4 GHz and 8.2 GHz.

18. The wireless communication device of claim 16, wherein the second carrier frequency is within a frequency range that is between 4.2 GHz and 5 GHz.

19. The wireless communication device of claim 16, wherein the second carrier frequency is within a frequency range that is between 6 GHz and 6.8 GHz.

20. The wireless communication device of claim 11, wherein the wireless communication device is a user equipment (UE).

* * * * *